(12) United States Patent
Cheng et al.

(10) Patent No.: US 7,599,698 B2
(45) Date of Patent: Oct. 6, 2009

(54) NETWORK CONTROLLED CHANNEL INFORMATION REPORTING

(75) Inventors: Jung-Fu Cheng, Cary, NC (US); Yi-Pin Wang, Cary, NC (US); Stephen J. Grant, Cary, NC (US); Leonid Krasny, Cary, NC (US); Karl J. Molnar, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1012 days.

(21) Appl. No.: 10/747,752

(22) Filed: Dec. 29, 2003

(65) Prior Publication Data

US 2005/0143084 A1    Jun. 30, 2005

(51) Int. Cl.
*H04W 72/00* (2006.01)
(52) U.S. Cl. ............ 455/452.2; 455/509; 455/510; 455/450; 455/453
(58) Field of Classification Search ......... 455/450–453, 455/509–510, 513, 423, 434; 370/252, 329, 370/341, 441, 465, 468, 523, 320
See application file for complete search history.

(56) References Cited

U.S. PATENT DOCUMENTS

| | | | | |
|---|---|---|---|---|
| 5,966,657 | A * | 10/1999 | Sporre ........................ | 455/425 |
| 6,445,917 | B1 * | 9/2002 | Bark et al. .................. | 455/423 |
| 6,748,224 | B1 * | 6/2004 | Chen et al. ............... | 455/456.1 |
| 2003/0123396 | A1 * | 7/2003 | Seo et al. ..................... | 370/252 |
| 2005/0159110 | A1 * | 7/2005 | Gaal et al. ............... | 455/67.11 |
| 2005/0277422 | A1 * | 12/2005 | Baker et al. ................. | 455/450 |

FOREIGN PATENT DOCUMENTS

| | | |
|---|---|---|
| EP | 1304900 A2 | 4/2003 |
| WO | WO 99/43178 | 8/1999 |
| WO | WO 00/70897 | 11/2000 |

OTHER PUBLICATIONS

3GPP TS 25.214 V5.3.0 (Dec. 2002); $3^{rd}$ Generation Partnership Project; Technical Specification Group Radio Access Network; Physical Layer Procedures (FDD) (Release 5); 3GPP; (63 pages).

(Continued)

*Primary Examiner*—Patrick N. Edouard
*Assistant Examiner*—Wayne Cai
(74) *Attorney, Agent, or Firm*—Coats & Bennett, P.L.L.C.

(57) ABSTRACT

A method of supplying channel information in a wireless communication system comprises a mobile terminal normally providing a basic channel report to the wireless communication system; the mobile terminal receiving at least one common feedback criterion broadcast to a plurality of mobile terminals; the mobile terminal determining if the mobile terminal satisfies a condition based on the at least one common feedback criterion; and the mobile terminal selectively providing an enhanced channel report to the wireless communication system based on the determining. The basic channel report may comprise information related to a first set of channel parameters, and the enhanced channel report may provide greater detail on the first set of channel parameters and/or relate to a second set of channel parameters. A method of a base station adaptively controlling channel information reporting by broadcast transmitting at least one common feedback criterion is also presented.

44 Claims, 6 Drawing Sheets

OTHER PUBLICATIONS

Evolving WCDMA for Improved High Speed Mobil Internet; by Stefan Parkvall, Janne Peisa, Anders Furuskar, Maria Samuelsson and Magnus Persson; Ericsson Research; (5 pages).

Gesbert, David and Alouini, Mohamed-Slim. "How Much Feedback is Multi-User Diversity Really Worth?" Proceeding of IEEE ICC'04, Jun. 2004. 0-7803-8533-0/04.

Heath et al., "Multimode Antenna Selection for Spatial Multiplexing Systems with Linear Receivers," IEEE Transactions on Signal Processing, Aug. 2005, pp. 3042-3056, vol. 53, No. 8.

Evolving WCDMA for Improved High Speed Mobil Internet; by Stefan Parkvall, Janne Peisa, Anders Furuskar, Maria Samuelsson and Magnus Persson; Ericsson Research; (5 pages), (2004).

* cited by examiner

NETWORK CONTROLLED CHANNEL INFORMATION REPORTING

BACKGROUND OF THE INVENTION

The present invention generally relates to wireless communication systems, and particularly relates to the reporting of channel information in a wireless communication system.

Channel information (e.g., signal to noise ratio on a particular channel or channel impulse response) helps characterize or otherwise describe a channel between a base station and a mobile terminal in a wireless communication system. If the fixed portion of the wireless communication system has knowledge of the channel characteristics, then the system can make adjustments to improve service. Indeed, the reporting of channel information from many mobile terminals back to base stations generally improves the system-wide performance of wireless communication systems. Further, the emerging multiple transmit antenna/multiple receive antenna systems see some of the most improvement from channel information feedback. It should be noted, however, that the theoretical amount and complexity of channel information that can be fed back increases as the number of transmit and receive antennas increases. Further, because of the time-varying fading environments encountered by mobile terminals, the feedback of channel information from the mobile terminals to the base stations should be timely.

SUMMARY OF THE INVENTION

In one embodiment, the present invention provides a method of reporting channel information in a wireless communication system, the method comprising a mobile terminal normally providing a basic channel report to the relatively fixed portion of the wireless communication system (e.g., to a base station), the basic channel report at least partially characterizing a downlink channel; the mobile terminal receiving at least one common feedback criterion broadcast to a plurality of mobile terminals; the mobile terminal determining if the mobile terminal satisfies a condition based on the at least one common feedback criterion; and the mobile terminal selectively providing an enhanced channel report regarding the downlink channel to the wireless communication system based on the determining. The basic channel report may comprise information related to a first set of one or more channel parameters of the downlink channel, and the enhanced channel report may provide greater detail on the first set of channel parameters than the basic channel report and/or the enhanced channel report may provide information related to a second set of one or more channel parameters of the downlink channel. In addition, the enhanced channel report may be a superset of the basic channel report.

In another embodiment, the present invention provides a method of controlling channel information reporting in a wireless communication system, the method comprising: a base station receiving a plurality of basic channel reports transmitted from a plurality of mobile terminals, the basic channel reports at least partially characterizing a downlink channel from the base station; determining, by the base station, at least one common feedback criterion based on a desired amount of enhanced channel reports; the at least one common feedback criterion helping to define a condition whose satisfaction controls which plurality of the plurality of mobile terminals subsequently transmit an enhanced channel report regarding the downlink channel to the base station; and broadcast transmitting the at least one common feedback criterion from the base station to the plurality of mobile terminals.

DETAILED DESCRIPTION OF THE INVENTION

Figure 1:
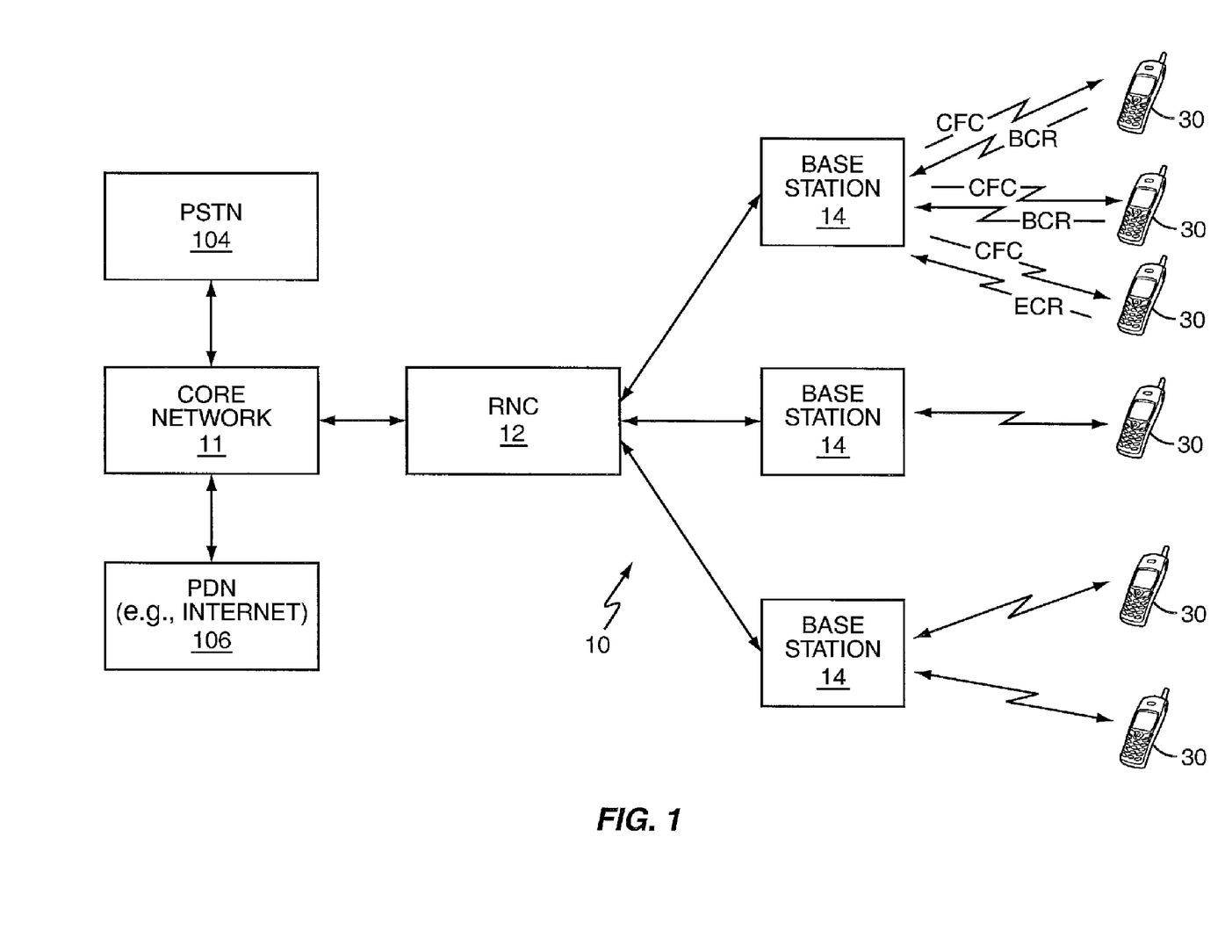
FIG. 1 shows a wireless communication network that may operate according to one or more embodiments of the present invention.

FIG. 1 illustrates an exemplary wireless communication network 10, which may be configured as a WCDMA/Release 5 network. For reference, the WCDMA Release 5 standard is discussed in "Evolving WCDMA for Improved High Speed Mobile Internet," S. Parkvall, J. Peisa, A. Furuskar, M. Samuelsson, and M. Persson, in Proc. Future Telecommunications Conference, Beijing, China, Nov. 28-30, 2001, which is incorporated herein by reference. In general, network 10 typically includes a core network 11 and a radio network. The radio network typically comprises a Radio Network Controller (RNC) 12 coupled to a plurality of base stations 14 (sometimes referred to as "node B's"). The RNC 12 may be thought of generally serving the function of the more commonly known Base Station Controllers (BSC) found in many existing wireless communication networks, such as GSM or IS-136 systems. The RNC 12 serves as a connection between the core network 11 and the base stations 14. The RNC 12 communicates with various external networks such as the Public Switched Telephone Network (PSTN) 104 and one or more Public Data Networks (PDNs, e.g., the Internet) 106 through the core network 11. Mobile terminals 30 communicate to the base stations 14 via the "air interface" as defined by the appropriate network standards. Those skilled in the art will appreciate that other network architectures may be used, and that network 10 may include more or different entities as needed or desired. In general, detailed knowledge of the operational functions of the wireless communication network 10 is not necessary for understanding the present invention, and such details are not discussed further herein as they are considered to be understood by those of ordinary skill in the art.

As shown in FIG. 1, each base station 14 is typically in direct communication with a plurality of mobile terminals 30. While a maximum of three mobile terminals 30 are shown in communication with a given base station 14 in FIG. 1, it should be understood that any number of mobile terminals 30 may be in direct communication with a given base station 14.

As understood by those of skill in the art, the downlink communications from the base station 14 to the mobile terminals 30 may be generally divided into "targeted" communications that are addressed to a single mobile terminal 30, or to a small group of mobile terminals 30, and "broadcast" communications that are intended for all mobile terminals 30 that are listening to the base station 14. Further, the targeted downlink communications from the base station 14 to the mobile terminals 30, particularly packet data transmissions, are typically subject to a scheduling scheme that helps govern how often and in what sequence mobile terminals 30 receive data. For example, the base station 14 may operate under a "maximum throughput" scheduling scheme, where the base station 14 identifies the mobile terminals 30 that can take data at the highest potential data rates, and preferentially allocates downlink resources to them so as to achieve the maximum overall data throughput. Alternatively, the base station 14 may operate under a "fair" scheduling scheme, where the base station 14 identifies the mobile terminal(s) 30 with the lowest average data rate and preferentially allocates more downlink resources to it/them so as to achieve a more equal actual data rate between all the mobile terminals 30. Still further, the base station 14 may operate under a "proportionally fair" scheduling scheme, where the base station 14 allocates downlink resources to the mobile terminals 30 in proportion to the ratio of their current data rates to the overall average data rate so as to "help" the more disadvantaged mobile terminals 30 more than the advantaged mobile terminals 30. And, of course, there are other scheduling schemes known to those of skill in the art.

In order for the scheduling schemes to work most efficiently, the base station 14 should know the characteristics of the downlink channels from the base station 14 to the respective mobile terminals 30 and other information such as present potential data rates, etc. Ideally, each mobile terminal 30 would report back enough channel characterization data so that the base station 14 would have complete knowledge of all the downlink channels. However, such complete feedback while theoretically useful, is decidedly impractical in most systems due to the very large amounts of bandwidth that would be required for each mobile terminal 30 to report back full channel characterization data, and the consumption of mobile terminal resources (e.g., battery power) would be significant. Thus, the typical system has each mobile terminal 30 feedback only a certain very limited amount of information about the downlink channel. Indeed, the typical approach is to have each mobile terminal 30 report back only a single value known in the art as the channel quality indicator (CQI) as described in 3GPP technical specification 25.214, v5.3.0, entitled "3rd Generation Partnership Project; Technical Specification Group Radio Access Network; Physical layer procedures (FDD)(Release 5)", which is incorporated herein by reference. The reported CQI is indicative of the potential data rate given current downlink channel conditions.

While reporting back the single CQI value has been effective for some systems, particularly single input single output (SISO) cellular systems, such an approach is less than ideal for many systems, particularly those systems 10 that use transmit and receive antenna diversity (multiple transmit antennas and multiple receive antennas). For such systems 10, the downlink channel from a base station 14 to a mobile terminal 30 is actually a composite of multiple sub-channels between the various antennas. As such, characterization of the downlink channel by a single value is imprecise at best. Instead, for the base station 14 to have a more complete picture of the downlink channels requires that the mobile terminals 30 feedback significantly more channel information. However, having each mobile terminal 30 regularly feedback this increased amount of information would have the negative effect of consuming significant system bandwidth, as discussed above, and depleting mobile terminal resources, such as battery or processing power.

Figure 2:
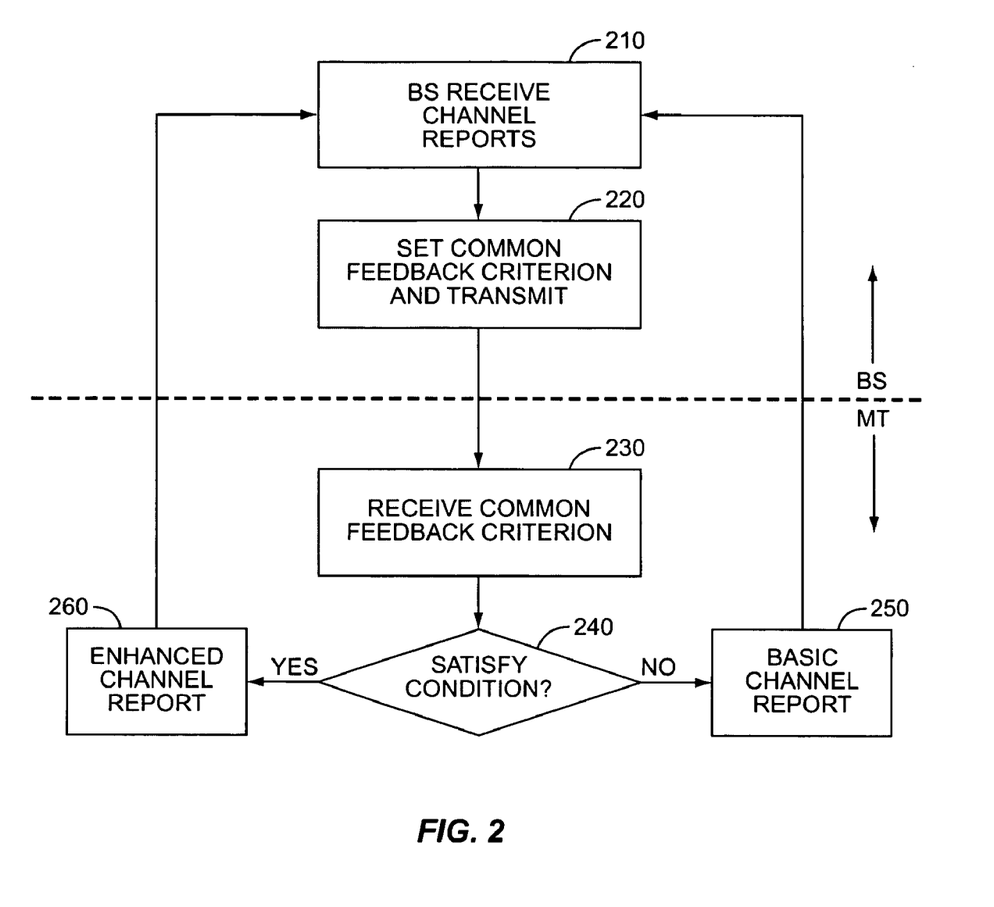
FIG. 2 shows a flowchart of one method of reporting channel information according to one or more embodiments of the present invention.

The process shown in FIG. 2 shows one approach to reporting channel information that allows the network 10 to control the channel information reporting (or "feedback") so that some mobile terminals 30 feedback a greater amount of channel information to the base station 14, while other mobile terminals 30 feedback only basic channel information. The process begins with the base station 14 receiving channel reports from the mobile terminals 30 (box 210). Based on those channel reports, the data ready to be sent to the various mobile terminals 30 (i.e., data queued at the base station 14 for transmission to the mobile terminals 30), and the base station's scheduling scheme, the base station 14 determines if more descriptive channel information than a basic channel report is desired from one or more mobile terminals 30. Based on that determination, the base station 14 sets one or more common feedback criteria (CFO) and transmits the same to the mobile terminals 30 in a broadcast type message (box 220). That is, the common feedback criteria are transmitted in such a fashion to be possibly received and understood by essentially all the mobile terminals 30 using the base station 14 (ignoring the effects of any transmission errors). Advantageously, this downlink message from the base station 14 includes not only the common feedback criteria, but may also include an indication of the relevant measurement window so as to establish a common time interval between the base station 14 and the mobile terminals 30 for purposes of measuring average throughput.

Just by way of non-limiting example, the base station 14 may use a downlink broadcast channel, such as the Common Control Physical Channel (CCPCH), to transmit the common feedback criterion (CFC) and relevant measurement window. The measurement window may optionally be defined as the interval starting from transmission time interval $N_0$ and ending at transmission time interval $N_1$. The values $N_0$ and $N_1$ can be broadcast on the downlink common control channel. Because the values of $N_0$ and $N_1$ will likely not vary rapidly, such a broadcast may not need to be repeated frequently. On the other hand, the common feedback criterion may need to vary more rapidly according to channel fading and network traffic conditions in order to efficiently control the amount of feedback from the mobile terminals 30 on the uplink, as discussed further below.

The mobile terminals 30 receive the common feedback criteria at box 230. Each mobile terminal 30 then determines whether or not it satisfies a condition based on the one or more common feedback criteria (box 240). For example, the condition may be a CQI of at least X, and a current average throughput of less than Y. If the mobile terminal 30 does not satisfy the condition, the mobile terminal 30 prepares a basic channel feedback report (BCR); for instance the traditional single value CQI, and transmits the basic channel feedback report to the base station 14 in a conventional fashion (box 250). If the mobile terminal 30 satisfies the condition, then the mobile terminal 30 prepares an enhanced channel feedback report (ECR) and transmits the enhanced channel feedback report to the base station (box 260). The base station 14 then receives the channel reports from the various mobile terminals 30 (box 210), and the process continues. It should be noted that the normal or default setting of the mobile terminals 30 in this example is to supply the basic channel feedback report, with the enhanced channel feedback reports being provided when the mobile terminal 30 satisfies the condition(s) outlined by the common feedback criteria.

One purpose of setting the one or common feedback criteria is for the base station 14 to control the number of mobile terminals 30 that report back basic channel reports versus enhanced channel reports. By adaptively controlling the parameters that trigger an enhanced channel report, the base station 14 can limit the number of mobile terminals 30 that send enhanced channel reports, at least indirectly. Thus, the base station 14 can set the common feedback criteria so that only a very few mobile terminals are predicted to be triggered to send enhanced channel reports, perhaps as few as one, perhaps even none. Further, through the selection of the common feedback criteria, the base station 14 can tailor the triggering condition so that mobile terminals 30 of particular interest (e.g., those with the best or worst current possible transmission rates) provide the most detailed channel feedback via an enhanced channel report, so that knowledge of these particular channel conditions can be utilized to improve system performance.

The common feedback criteria discussed above may take the form of individual threshold values, such as current potential transmission rate less than Y, but it should be understood that the common feedback criteria may also take the form of ranges, such as current transmission rate between Y and Z. And, as should be clear from the discussion above, the one or more common feedback criteria may relate to one or more parameters of the downlink channel and/or transmission parameters of the mobile terminal 30. However, the terms "common feedback criterion" and "common feedback criteria" as used herein specifically exclude any mobile terminal identification information, such as mobile terminal identity, user identity, ESN, IMSI, phone number, and the like.

The mobile terminal 30 may either explicitly or implicitly signal whether the channel report being transmitted to the base station 14 is a basic channel report or an enhanced channel report. For instance, the mobile terminal 30 may use an explicit signal, such as the Transmit Format Combination Indicator (TFCI) 316 (see FIG. 3), or may use an implicit signaling approach of using a different pilot pattern 314 (see FIG. 4) when sending an enhanced channel report.

Figure 3:
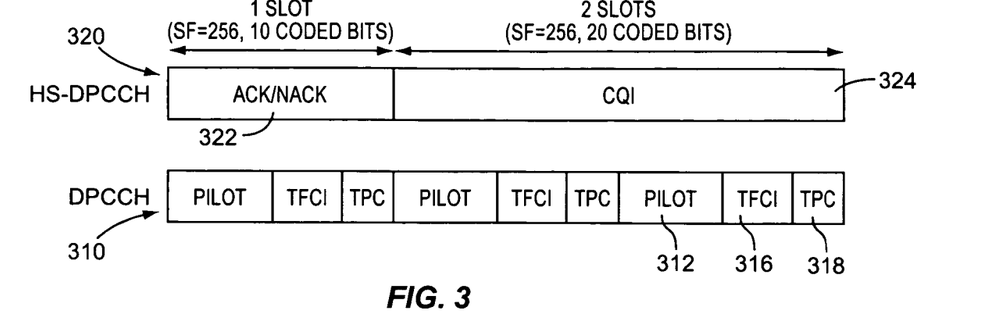
FIG. 3 shows one message arrangement that may be used by a mobile terminal to transmit channel reports.

FIG. 3 shows one approach that may be used by the mobile terminal 30 to send a channel report on the uplink. As is understood by one familiar with WCDMA/R5, the mobile terminal 30 may transmit a basic channel report to the base station 14 using the High Speed Dedicated Physical Control Channel (HS-DPCCH) 320 for the channel report itself and optionally using the Dedicated Physical Control Channel (DPCCH) 310 to indicate the presence/type of channel report. The mobile terminal 30 may transmit pilot patterns 312, TFCI 316, and Transmit Power Command (TPC) 318 on the DPCCH 310. When the mobile terminal 30 sends a basic channel report (step 250) the TFCI 316 would be set to a predetermined value (or one of a set of predetermined values) that the base station 14 would recognize as indicating that a basic channel report was being sent. The basic channel report data may be sent on the HS-DPCCH 320, for instance in the form of the conventional CQI 324, with the conventional ACK/NACK 322 for HARQ. On the other hand, when the mobile terminal 30 sends an enhanced channel report, the mobile terminal 30 may use a similar signaling arrangement, but with the TFCI 316 set to a different value (or one of a different set of values) that indicates that an enhanced channel report is being sent. Note that in the illustrative example of FIG. 3, the channel report on the HS-DPCCH 320 may use twenty coded bits (typically corresponding to five information bits).

Figure 4:
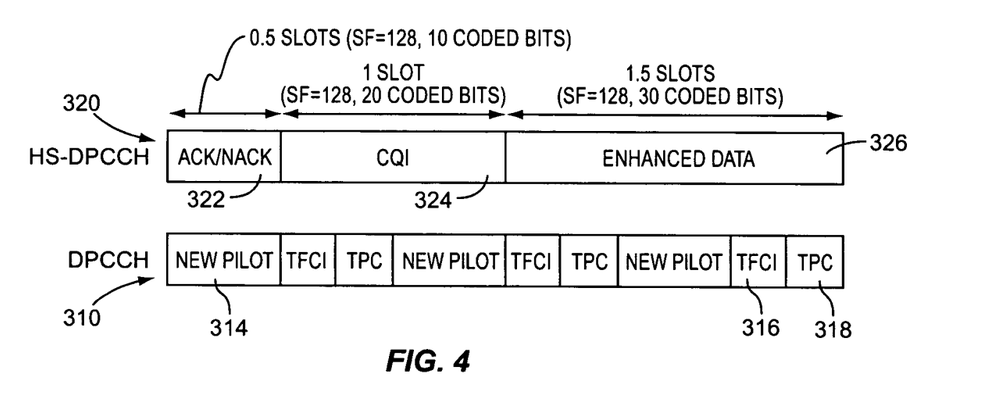
FIG. 4 shows an alternate message arrangement that may be used by a mobile terminal to transmit channel reports.

Alternatively, the mobile terminal 30 may use implicit signaling to indicate when the mobile terminal 30 sends an enhanced channel report. As shown in FIG. 4, the mobile terminal 30 may transmit the DPCCH 310 as described above, but with a different pilot pattern 314. The mobile terminal 30 may also transmit the HS-DPCCH 320 with a lower spreading factor, thereby increasing the number of information bits that could be transmitted in a given time interval; the enhanced channel report could then be transmitted in the illustrated example with fifty coded bits. In such an arrangement, the enhanced channel report could be a superset of the basic channel report, in that it could contain the same information as the basic channel report (e.g., CQI 324) plus additional channel information. The base station 14, at step 210, would decode the DPCCH 310 using the "normal" pilot 312, and if this decoding failed, try the alternate pilot pattern 314. When the alternate pilot pattern 314 is detected, the base station 14 would then decode the HS-DPCCH 320 accordingly to extract the enhanced channel report.

Figure 5:
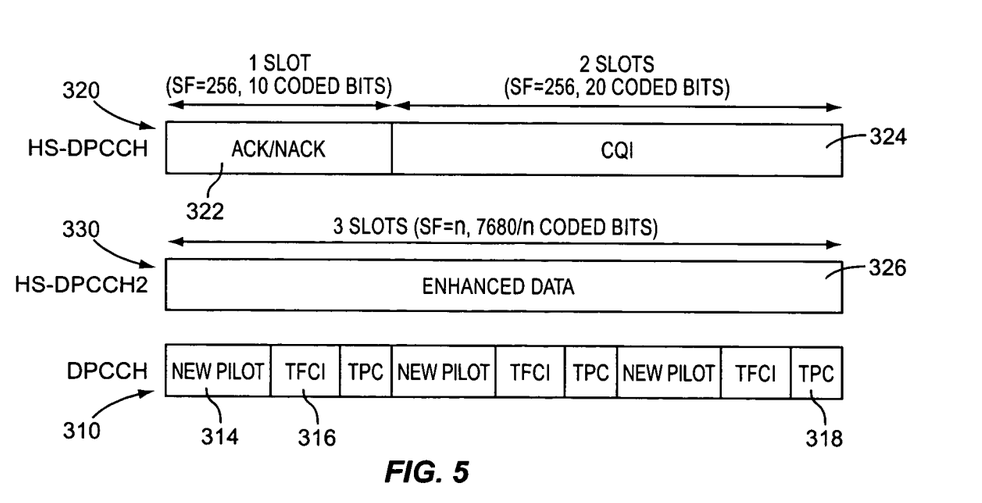
FIG. 5 shows still another message arrangement that may be used by a mobile terminal to transmit channel reports.

In the example immediately above, the enhanced channel report was transmitted over an existing control channel, the HS-DPCCH 320, using a spreading factor that is less than the normal spreading factor. However, another alternative, shown in FIG. 5, would be to maintain the normal spreading factor for the existing HS-DPCCH 320 and transmit at least a portion of the enhanced channel report on another uplink channel, such as on the new uplink channel HS-DPCCH2 330. This HS-DPCCH2 channel 330 could use the same spreading factor (e.g., 256 in the illustrated example), or may use a different spreading factor so as to allow for a greater number of information bits to be transmitted in the relevant time period. The presence of HS-DPCCH2 330 may be detected blindly or through the use of an alternative pilot pattern in the DPCCH 310 as described earlier.

The enhanced channel report is intended to provide the base station 14 with a better picture of the downlink channel as perceived by the mobile terminal 30 reporting the enhanced channel report. As such, the enhanced channel report may provide more detailed information than the basic channel report and/or may provide information on different channel parameters than the basic channel report. For example, the basic channel report may be the single value aggregate CQI discussed above, while the enhanced channel report may be the signal-to-noise ratios for multiple antennas, the measured power on the channel from each antenna, the estimated channel coefficients and delays for multiple antennas, the decoding order for the different antennas, impairment covariance matrix, measured noise power, and/or recommended data rates for multiple data streams, etc. Further, as discussed above, the enhanced channel report may include the information of a basic channel report plus other parameters, with the additional data of the enhanced channel report advantageously multiplexed (e.g., time, code, and/or frequency division multiplexed) with the data of the basic channel report. Thus, the basic channel report may be viewed as providing a first level of detail about the downlink channel, while the enhanced channel report provides a second, more detailed view of the downlink channel, with the understanding that this more detailed view may be with relation to the same or different parameters. The specific parameters to be included in the enhanced channel report can be signaled to the mobile terminal 30 by the base station 14 explicitly, be implicitly signaled based on the enhanced feedback criteria used, or predetermined and programmed into the mobile terminal 30.

The setting of the one or more common feedback criteria (box 220) by the base station 14 is, as described above, advantageously based on those channel reports received by the base station in box 210, the data queued to be sent to the various mobile terminals 30, and the base station's scheduling scheme; although other parameters, and/or combination of parameters, may alternatively be considered. For a base station 14 using a "maximum throughput" scheduling scheme, the base station 14 may advantageously look at the channel reports from the mobile terminals 30 for the previous transmission time interval, determine an amount of desired enhanced channel reports (e.g., K), and set the common feedback criteria so that only K of the mobile terminals 30 would have exceeded a threshold established by the common feedback criteria. Alternatively, for a base station 14 using a "proportionally fair" scheduling scheme, the base station 14 may advantageously maintain a record of the average throughput of the mobile terminals 30. Then, based on the channel reports from the mobile terminals 30 for the previous transmission time interval, the base station 14 may calculate a current proportional fair metric for each mobile terminal 30, and then set the common feedback criteria so that only K of the mobile terminals 30 would have their metrics for the current transmission time interval exceed a threshold established by the common feedback criteria. Of course, other considerations, such as the amount of data queued at the base station 14 should also be taken into account. It should be noted that under either scenario more or less than K mobile terminals 30 may end up transmitting enhanced channel reports based on the common feedback criteria, as the channel conditions may have changed from the previous transmission time interval to the current transmission time interval, but the setting of the common feedback criteria may still be viewed as controlling which of the plurality of mobile terminals 30 subsequently transmit an enhanced channel report regarding the downlink channel to the base station 14. Thus, the base station 14 may adaptively control the type of channel reports provided by the mobile terminals 30 through the selection of the proper common feedback criteria, and particularly the amount of enhanced channel reports that are provided from the plurality of mobile terminals 30.

In several of the embodiments, the enhanced channel report is transmitted by the mobile terminal 30 during the same time interval as the basic channel report would normally be reported, on the same uplink channel and/or on a different uplink channel. Such a temporal arrangement is believed advantageous, as the base station 14 can thereby process and utilize the data from the channel reports provided from the various mobile terminals 30 in a timely fashion. However, some delay may be tolerated in providing the enhanced channel reports, such as if the enhanced channel report requires two or more transmission time intervals to transmit. In some embodiments, the transmission of channel reports by the mobile terminal 30 is performed on a periodic basis; but such is not strictly required, and the reporting may, for example, alternatively be non-periodic or triggered, as is desired.

As indicated above, the mobile terminal 30 determines whether or not to send an enhanced channel report based on the common feedback criterion (or criteria) broadcast by the base station 14. It should be noted that the condition whose satisfaction triggers the sending of the enhanced channel report may be multi-variable or single variable, depending on the particular embodiment. Further, the condition may be defined entirely by the common feedback criteria or may alternatively be defined by a combination of the common feedback criterion and some other information stored and/or calculated at the mobile terminal 30; either way the condition is considered as being based on the common feedback criterion (criteria). Further, satisfaction of the condition may mean meeting or failing to meet the condition, depending on the particular embodiment.

Figure 6:
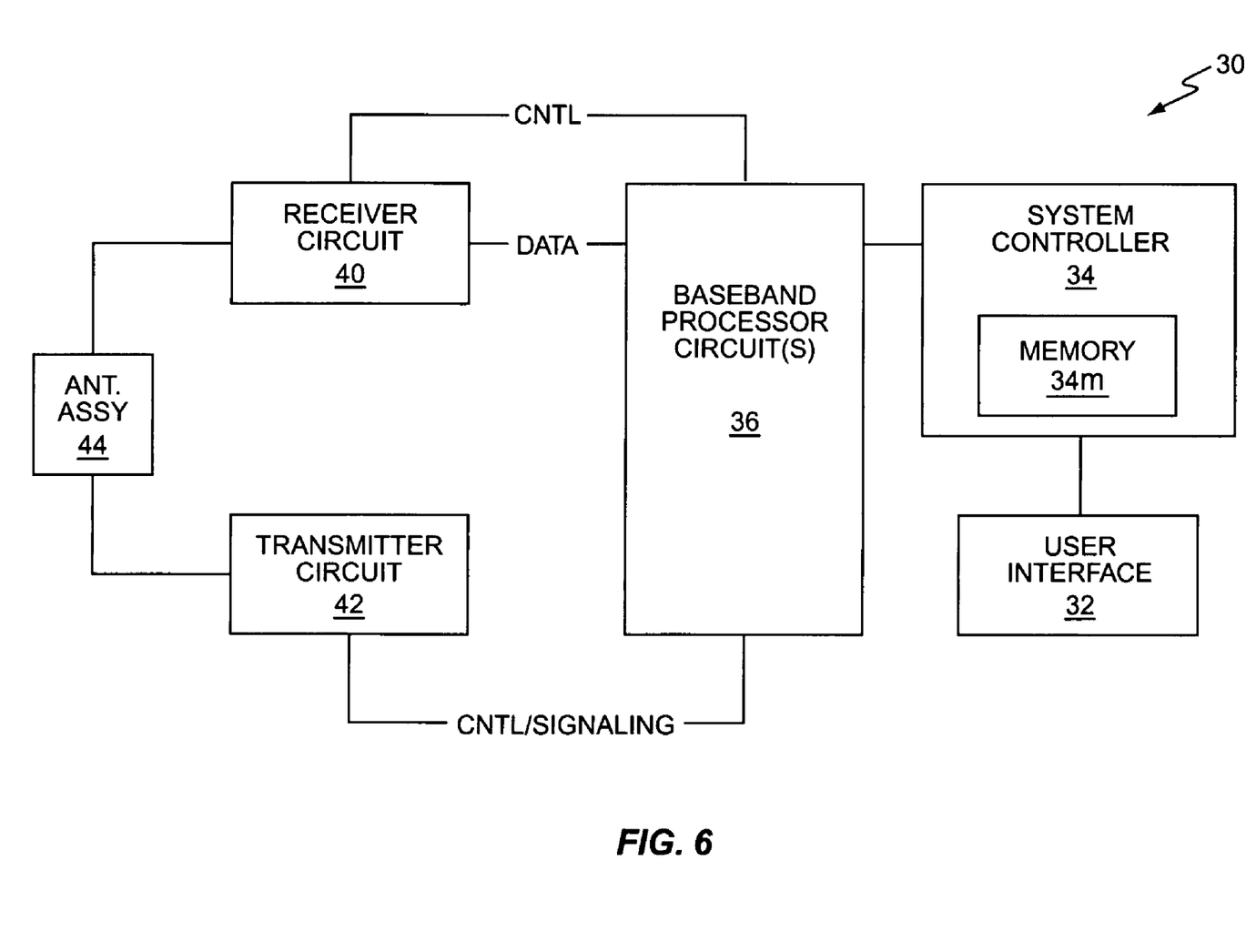
FIG. 6 shows one possible embodiment of a mobile terminal that may operate according to one or more embodiments of the present invention.

As used herein, the term "mobile terminal" 30 may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals 30 also may be referred to as "pervasive computing" devices. In one embodiment, shown in FIG. 6, the mobile terminal 30 may include a user interface 32 (e.g., keyboard, display, microphone, speaker, etc.) coupled to a system controller 34. The system controller 34 communicates with receiver circuit(s) 40 and transmitter circuit(s) 42 and works in conjunction with a baseband processor 36. The receiver circuit(s) 40 and the transmitter circuit(s) 42 may optionally be combined into one or more transceiver circuits (not shown), but such an arrangement should be considered to have both the receiver circuit 40 and the transmitter circuit 42 within the meaning of this document. The receiver circuit 40 and transmitter circuit 42 receive and transmit RF signals respectively via an antenna assembly 44, which is advantageously a multiple antenna arrangement. As the operational details of mobile terminals 30 in general are known to those of skill in the art and not critical to understanding the present invention, such details are omitted for brevity. However, it should be noted that in one or more exemplary embodiments, at least portions of receiver circuit 40 and/or the transmitter circuit 42 and/or the baseband processor 36 and/or the system controller 34 may be implemented as an Integrated Circuit (IC). Thus, for example, some or all of transmit circuit 40 and/or receiver circuit 42 may be implemented as coded program instructions stored in a computer-readable medium (such as memory device(s) which may comprise FLASH, EPROM, etc.) that instruct a processor to carry out the desired operations. Such a processor might be a Digital Signal Processor (DSP), a microprocessor or microcontroller, or might be a logic circuit (or circuits) implemented as part of an Application Specific Integrated Circuit (ASIC). Additionally, some or all of receiver or transmitter may be implemented as programmable or dedicated logic circuits within a Complex Programmable Logic Device (CPLD), Field Programmable Gate Array (FPGA), or other form of Integrated Circuit (IC). Of course, the foregoing embodiments are exemplary rather than exhaustive.

It should be noted that the mobile terminal 30 may be advantageously be programmed to operate in a Code Division Multiple Access (CDMA) environment, such as that known as WCDMA Release 5, but may alternatively be programmed to operate in a Time Division Multiple Access (TDMA) based wireless communication network, such as IS-136, GSM, or GSM/EDGE communication networks, or according to any other known wireless communications protocol. As such, while the majority of the discussion above has been in the context of a WCDMA based wireless communication networks, it should be understood that the present invention may be applied in other types of wireless communication networks, such as those based on TDMA, GSM, IS-136, conventional CDMA, etc.

It should be noted that the present invention may, as indicated above, find particularly advantageous application in MIMO (multiple receive and multiple transmit antennas) type wireless communication systems. However, the present invention is not limited to such systems, and may be used other systems, such as, for example, SIMO (single receive, multiple transmit antennas) type wireless communication systems, MISO (multiple receive, single transmit antennas) type wireless communication systems, and SISO (single receive, single transmit antennas) type wireless communication systems, and/or hybrids thereof.

The discussion above has been in the context of the mobile terminal 30 determining whether or not to send an enhanced channel report based on the common feedback criterion (or criteria) broadcast by the base station 14. It should be noted that the mobile terminal may also be programmed to automatically transmit an enhanced channel report when the most recent packet was not received successfully.

Figure 7:
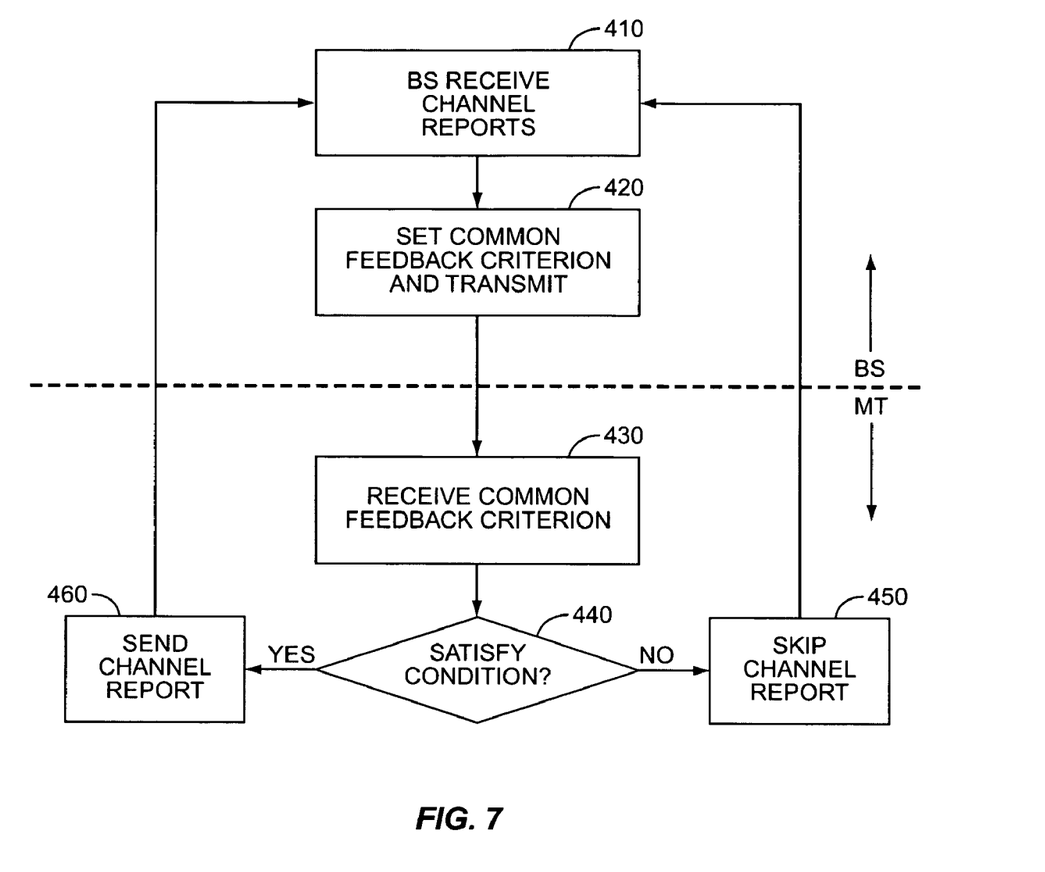
FIG. 7 shows a flowchart of a method of reporting channel information according to one or more embodiments of the present invention.

Further, while discussion above has been in the context of the mobile terminal 30 determining whether or not to send an enhanced channel report based on the common feedback criterion (or criteria) broadcast by the base station 14, the approach can be generalized to allow the base station 14 to control when the mobile terminals 30 provide any channel reports. For this more general embodiment shown in FIG. 7, the base station 14 receives channel reports from the mobile terminals 30 (box 410). Based on those channel reports, the data ready to be sent to the mobile terminals 30, and its scheduling scheme, the base station 14 determines if more, less, or generally the same amount of channel reports from one or more mobile terminals 30 is desired. Based on that determination, the base station 14 sets one or more common feedback criteria and transmits the same to the mobile terminals 30 in a broadcast type message (box 420). The mobile terminals 30 receive the common feedback criteria at box 430. Each mobile terminal 30 then determines whether or not it satisfies a condition based on the one or more common feedback criteria (box 440). If the mobile terminal 30 does not satisfy the condition, the mobile terminal 30 does not send any channel report to the base station 14 for that time period (box 450). If the mobile terminal 30 satisfies the condition, then the mobile terminal 30 prepares a channel feedback report and transmits the channel feedback report to the base station (box 460). The channel feedback report of step 460 can be either the basic channel report or the enhanced channel report described above. The base station 14 then receives the channel reports from the various mobile terminals 30 (box 410), and the process continues. Thus, in the more general approach of FIG. 7, the mobile terminal 30 determines whether or not to send any channel report based on the common feedback criterion (or criteria) broadcast by the base station 14. Thus, the process of FIG. 7 allows the base station 14 to adaptively control when and/or how much the mobile terminals 30 provide any channel reports.

Figure 8:
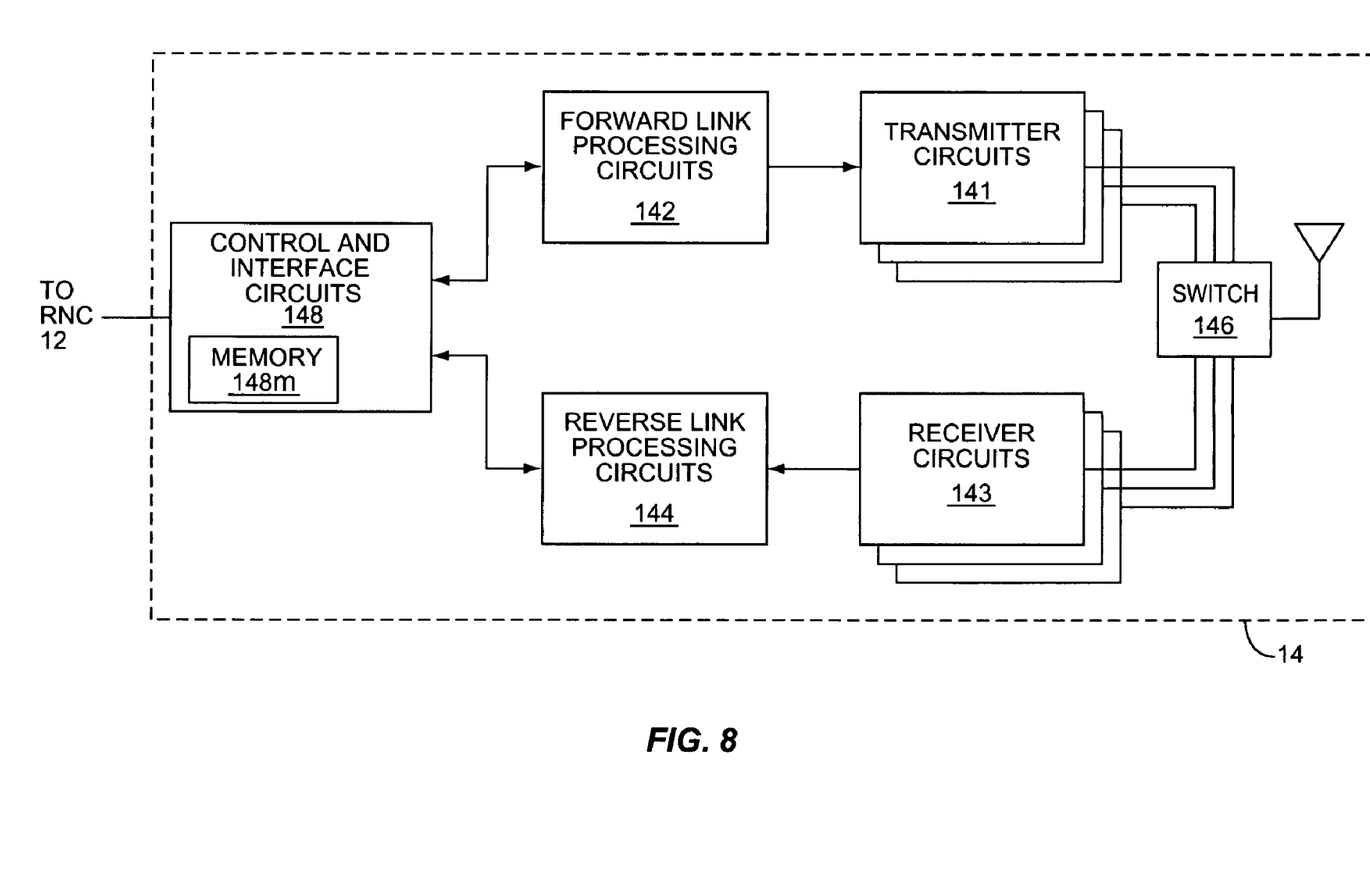
FIG. 8 shows one possible embodiment of a base station that may operate according to one or more embodiments of the present invention.

FIG. 8 shows a functional diagram of an exemplary base station 14 according to one embodiment of the present invention. It will be appreciated that the present invention is not limited to the base station architecture illustrated in FIG. 8, and that other base station architectures are applicable to the present invention. As shown in FIG. 8, base station 14 includes transmitter circuits 141, forward link signal processing circuits 142, receiver circuits 143, reverse link signals processing circuits 144, switch 146, and control and interface circuits 148. The transmitter circuits 141 include the necessary RF circuits, such as modulators and power amplifiers, to transmit signals to mobile terminals 30. The forward link signal processing circuits 142 process the signals being transmitted to the mobile terminals 30. Forward link signal processing may include digital modulation, encoding, interleaving, encryption, and formatting. The receiver circuits 143 comprise the RF components, such as a receiver front end, necessary to receive signals form the mobile terminals 30. Reverse link processing circuits 144 process the signals received from the mobile terminals 30. Reverse link processing may include, for example, digital demodulation, decoding, de-interleaving, and decryption. Switch 146 connects the transmitter circuits 141 and the receiver circuits 143 to one or more antennas. Control and interface circuits 148 coordinate the operation of the base station 14 and the mobile terminals 30 within the applicable communication standards and interface the base station 14 with the RNC 12. The forward link processing circuits 142, reverse link processing circuits 144, and control and interface circuits 148 may be integrated in a single processor, or may be implemented in multiple processors, hardware circuits, or a combination of processors and hardware circuits. Further, the functional elements of FIG. 8 may be implemented in software, hardware, or some combination of both. For example, one or more of the functional elements in base station 14 may be implemented as stored program instructions executed by one or more microprocessors or other logic circuits included in base station 14, such as a microprocessor comprising the control and interface circuits 148.

Given its broad range of applications and the variety of systems in which the present invention may be implemented, those skilled in the art should appreciate that the present invention may be embodied in any number of specific physical implementations, including but not limited to the exemplary embodiment illustrated in the Figures. More generally, the present invention may be embodied in hardware and/or software (including firmware, resident software, micro-code, etc.). Furthermore, some embodiments of the present invention may take the form, in whole or in part, of a computer program product on a computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. By way of non-limiting example, the computer readable medium may take the form of suitable memory 34m in or accessible by controller 34 (e.g., random access memory, read only memory, programmable array logic, disk drive, etc.), or suitable memory 148m in or accessible to control and interface circuits 148, which may contain suitable program instructions to implement the method(s) described above.

Additionally, those skilled in the art should recognize that, in general, the foregoing description and the accompanying illustrations represent exemplary embodiments of the present invention and should not be construed as limiting it. Indeed, the present invention is limited only by the following claims and the reasonable equivalents thereof.

What is claimed is:

1. A method of reporting channel information in a wireless communication system, comprising:
    a mobile terminal normally providing a basic channel report, said basic channel report at least partially characterizing a downlink channel;
    said mobile terminal receiving at least one common feedback criterion broadcast to a plurality of mobile terminals;
    said mobile terminal determining whether said mobile terminal satisfies a condition based on said at least one common feedback criterion; and
    said mobile terminal selectively providing an enhanced channel report regarding said downlink channel if said condition is satisfied, wherein said enhanced channel report provides a more detailed view of said downlink channel than said basic channel report.

2. The method of claim 1 wherein providing an enhanced channel report comprises providing an enhanced channel report that is a superset of said basic channel report.

3. The method of claim 1 wherein said at least one common feedback criterion comprises at least one threshold.

4. The method of claim 3 wherein said at least one common feedback criterion comprises a channel quality indicator threshold.

5. The method of claim 3 wherein said at least one common feedback criterion comprises a throughput level threshold.

6. The method of claim 1 wherein said at least one common feedback criterion comprises at least one range.

7. The method of claim 1 wherein said basic channel report comprises a channel quality indicator.

8. The method of claim 1 wherein normally providing a basic channel report comprises normally providing a basic channel report on a periodic basis.

9. The method of claim 1 wherein said mobile terminal selectively providing an enhanced channel report based on said determining comprises said mobile terminal selectively providing, on a periodic basis, either said basic channel report or said enhanced channel report based on said determining.

10. The method of claim 1 wherein said basic channel report comprises information related to a first set of one or more channel parameters of said downlink channel, and wherein said enhanced channel report comprises further information on said first set of channel parameters.

11. The method of claim 1 wherein said basic channel report comprises information related to a first set of one or more channel parameters of said downlink channel, and wherein said enhanced channel report comprises information related to a second set of one or more channel parameters of said downlink channel different from said first set of channel parameters.

12. The method of claim 1 wherein said basic channel report comprises information related to a first set of one or more channel parameters of said downlink channel, and wherein said enhanced channel report comprises information related to said first set of channel parameters and information related to a second set of one or more channel parameters of said downlink channel different from said first set of channel parameters.

13. The method of claim 1:
wherein said basic channel report comprises a channel quality indicator; and
wherein said mobile terminal selectively providing an enhanced channel report based on said determining comprises said mobile terminal selectively providing either said basic channel report or said enhanced channel report based on said determining.

14. The method of claim 1 further comprising providing an explicit indication of the presence of said enhanced channel report when said enhanced channel report is provided.

15. The method of claim 1 further comprising employing a first spreading factor when transmitting said basic channel report and indicating the presence of said enhance channel report by employing a different second spreading factor when said enhanced channel report is transmitted.

16. The method of claim 1 further comprising employing a first pilot pattern when transmitting said basic channel report and indicating the presence of said enhance channel report by selectively employing a different second pilot pattern when said enhanced channel report is transmitted than when said basic channel report is transmitted.

17. The method of claim 1:
wherein providing a basic channel report comprises providing a basic channel report over a first logical channel; and
wherein selectively providing an enhanced channel report regarding said downlink channel comprises selectively providing an enhanced channel report over said first logical channel.

18. The method of claim 1:
wherein providing a basic channel report comprises providing a basic channel report over a first logical channel; and
wherein selectively providing an enhanced channel report regarding said downlink channel comprises selectively providing an enhanced channel report over at least a second logical channel.

19. The method of claim 18 wherein selectively providing an enhanced channel report over at least a second logical channel comprises selectively providing an enhanced channel report over said first logical channel and said second logical channel.

20. A wireless communications mobile terminal, comprising:
a transmitter operative to normally provide a basic channel report, said basic channel report at least partially characterizing a downlink channel;
a receiver operative to receive at least one common feedback criterion broadcast to a plurality of mobile terminals;
control logic coupled to said transmitter and said receiver and operative to determine whether said mobile terminal satisfies a condition based on said at least one common feedback criterion and to cause said transmitter to selectively transmit an enhanced channel report regarding said downlink channel if said condition is satisfied, wherein said enhanced channel report provides a more detailed view of said downlink channel than said basic channel report.

21. The mobile terminal of claim 20 wherein said enhanced channel report is a superset of said basic channel report.

22. The mobile terminal of claim 20 wherein said basic channel report comprises a channel quality indicator.

23. The mobile terminal of claim 20 wherein said transmitter is operative to normally provide said basic channel report on a periodic basis.

24. The mobile terminal of claim 20 wherein said basic channel report comprises information related to a first set of one or more channel parameters of said downlink channel, and wherein said enhanced channel report comprises further information on said first set of channel parameters.

25. The mobile terminal of claim 20 wherein said basic channel report comprises information related to a first set of one or more channel parameters of said downlink channel, and wherein said enhanced channel report comprises information related to a second set of one or more channel parameters of said downlink channel different from said first set of channel parameters.

26. The mobile terminal of claim 20 wherein said basic channel report comprises information related to a first set of one or more channel parameters of said downlink channel, and wherein said enhanced channel report comprises information related to said first set of channel parameters and information related to a second set of one or more channel parameters of said downlink channel different from said first set of channel parameters.

27. The mobile terminal of claim 20 wherein said control logic is further operative to cause said transmitter to transmit an explicit indication of the presence of said enhanced channel report when said enhanced channel report is transmitted.

28. The mobile terminal of claim 20 wherein said control logic is further operative to cause said transmitter to transmit using a first spreading factor if transmitting said basic channel report and a different second spreading factor if transmitting said enhanced channel report o indicate the presence of said enhanced channel report.

29. The mobile terminal of claim 20 wherein said control logic is further operative to cause said transmitter to transmit using a first pilot pattern if transmitting said basic channel report and a different second pilot pattern if transmitting said enhanced channel report to indicate the presence of said enhanced channel report.

30. The mobile terminal of claim 20:
wherein said transmitter is operative to normally said basic channel report over a first logical channel; and
wherein said control logic is further operative to cause said transmitter to selectively transmit an enhanced channel report regarding said downlink channel over said first logical channel based on said determining.

31. The mobile terminal of claim 20:
wherein said transmitter is operative to normally said basic channel report over a first logical channel; and
wherein said control logic is further operative to cause said transmitter to selectively transmit an enhanced channel report regarding said downlink channel over at least a second logical channel based on said determining.

32. The mobile terminal of claim 31 wherein said control logic is further operative to cause said transmitter to selectively transmit an enhanced channel report regarding said downlink channel over said first logical channel and said second logical channel based on said determining.

33. A method of controlling channel information reporting in a wireless communication system, comprising:
a base station receiving a plurality of basic channel reports transmitted from a plurality of mobile terminals, said basic channel reports at least partially characterizing one or more downlink channels from said base station;
determining, by said base station, at least one common feedback criterion; said at least one common feedback criterion helping to define a condition whose satisfaction controls which plurality of said plurality of mobile terminals subsequently transmit an enhanced channel report regarding one or more of said downlink channels to said base station;
broadcast transmitting said at least one common feedback criterion from said base station to said plurality of mobile terminals; and
wherein said enhanced channel report provides a more detailed view of said downlink channel than said basic channel report.

34. The method of claim 33 wherein determining at least one common feedback criterion comprises determining at least one common feedback criterion based on at least a desired amount of enhanced channel reports.

35. The method of claim 34 wherein determining at least one common feedback criterion based on a desired amount of enhanced channel reports comprises determining at least one common feedback criterion based on said desired amount of enhanced channel reports and a data throughput rate.

36. The method of claim 34 wherein determining at least one common feedback criterion based on a desired amount of enhanced channel reports comprises determining at least one common feedback criterion based on said desired amount of enhanced channel reports and at least one reported channel quality indicator.

37. The method of claim 36 wherein determining at least one common feedback criterion based on said desired amount of enhanced channel reports and at least one reported channel quality indicator comprises determining at least one common feedback criterion based on said desired amount of enhanced channel reports and a plurality of reported channel quality indicators.

38. The method of claim 34 wherein determining at least one common feedback criterion based on a desired amount of enhanced channel reports comprises determining at least one common feedback criterion based on said desired amount of enhanced channel reports and an amount of data queued at said base station for transmission to a plurality of said plurality of mobile terminals.

39. A base station in a wireless communication system, comprising:
at least one receiver circuit receiving a plurality of basic channel reports transmitted from a plurality of mobile terminals, said basic channel reports at least partially characterizing one or more downlink channels from said base station;
a transmitter;
control logic connected to said receiver and said transmitter and operative to determine at least one common feedback criterion; said at least one common feedback criterion helping to define a condition whose satisfaction controls which plurality of said plurality of mobile terminals subsequently transmit an enhanced channel report regarding one or more of said downlink channels to said base station;
said control logic further operative to cause said transmitter to transmit said at least one common feedback criterion in a broadcast fashion from said base station to said plurality of mobile terminals; and
wherein said enhanced channel report provides a more detailed view of said downlink channel than said basic channel report.

40. The base station of claim 39 wherein said control logic is further operative to determine said at least one common feedback criterion based on at least a desired amount of enhanced channel reports.

41. The base station of claim 40 wherein said control logic is further operative to determine said at least one common feedback criterion based on said desired amount of enhanced channel reports and a data throughput rate.

42. The base station of claim 40 wherein said control logic is further operative to determine said at least one common feedback criterion based on said desired amount of enhanced channel reports and at least one reported channel quality indicator.

43. The base station of claim 42 wherein said control logic is further operative to determine said at least one common feedback criterion based on said desired amount of enhanced channel reports and a plurality of reported channel quality indicators.

44. The base station of claim 40 wherein said control logic is further operative to determine said at least one common feedback criterion based on said desired amount of enhanced channel reports and an amount of data queued at said base station for transmission to a plurality of said plurality of mobile terminals.

* * * * *

UNITED STATES PATENT AND TRADEMARK OFFICE
CERTIFICATE OF CORRECTION

PATENT NO. : 7,599,698 B2  
APPLICATION NO. : 10/747752  
DATED : October 6, 2009  
INVENTOR(S) : Cheng et al.

Page 1 of 1

It is certified that error appears in the above-identified patent and that said Letters Patent is hereby corrected as shown below:

On Page 2, item (56), under "OTHER PUBLICATIONS", in Column 2, Line 4, delete "Mobil" and insert -- Mobile --, therefor.

In Column 4, Line 22, delete "(CFO)" and insert -- (CFC) --, therefor.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,599,698 B2 | Page 1 of 1 |
| APPLICATION NO. | : 10/747752 | |
| DATED | : October 6, 2009 | |
| INVENTOR(S) | : Cheng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Twenty-eighth Day of September, 2010

David J. Kappos
*Director of the United States Patent and Trademark Office*